(12) United States Patent
Jones et al.

(10) Patent No.: US 7,470,889 B2
(45) Date of Patent: Dec. 30, 2008

(54) SERVO CLEAT FOR AN ENCODER, AN ENCODER INCLUDING A SERVO CLEAT AND A SYSTEM INCLUDING AN ENCODER, A MOTOR AND A SERVO CLEAT

(75) Inventors: Jonathan Jones, Santa Barbara, CA (US); Touyer Moua, Santa Maria, CA (US)

(73) Assignee: Renco Encoders, Inc., Goleta, CA (US)

( * ) Notice: Subject to any disclaimer, the term of this patent is extended or adjusted under 35 U.S.C. 154(b) by 570 days.

(21) Appl. No.: 11/144,182

(22) Filed: Jun. 2, 2005

(65) Prior Publication Data
US 2007/0009323 A1 Jan. 11, 2007

(51) Int. Cl.
*G01D 5/34* (2006.01)
(52) U.S. Cl. .................. 250/231.13; 33/1 PT
(58) Field of Classification Search .......... 250/231.13–231.18; 33/1 PT
See application file for complete search history.

(56) References Cited

U.S. PATENT DOCUMENTS

| 4,338,517 A | 7/1982 | Perrine |
| 5,117,879 A * | 6/1992 | Payne ............... 144/48.6 |
| 5,407,294 A | 4/1995 | Giannini |
| 5,859,425 A | 1/1999 | Mleinek et al. |
| 6,717,302 B2 | 4/2004 | Kolloff et al. |

FOREIGN PATENT DOCUMENTS

| DE | 197 39 012 | 3/1999 |
| GB | 556.019 | 4/1942 |

* cited by examiner

*Primary Examiner*—Thanh X Luu
(74) *Attorney, Agent, or Firm*—Kenyon & Kenyon LLP

(57) ABSTRACT

A device for mounting an encoder on a motor includes a first part including at least one first mounting ear and a second part including at least one second mounting ear. A first end of the first part is adapted to connect to a second end of the second part, and a second end of the first part is adapted to connect to a first end of the second part to form a substantially circular cleat. An inner diameter of the cleat is adapted to couple to a housing of the encoder, and the mounting ears are adapted to mount to the motor.

41 Claims, 6 Drawing Sheets

SERVO CLEAT FOR AN ENCODER, AN ENCODER INCLUDING A SERVO CLEAT AND A SYSTEM INCLUDING AN ENCODER, A MOTOR AND A SERVO CLEAT

FIELD OF THE INVENTION

The present invention relates to a servo cleat for an encoder, an encoder including a servo cleat and a system including an encoder, a motor and a servo cleat.

BACKGROUND INFORMATION

Encoders are used to measure angular or linear motion. A common use of encoders is for computer numeric control (CNC) machines. Encoder housings may be made of metal, e.g., in a bearing encoder, or plastic, e.g., in a modular encoder, and may include printed circuit boards (PCB).

In modular encoders, the surface of the housing that contacts the motor is made of non-conductive plastic. In some situations, an O-bracket and a wire may be soldered to the PCB to create an electrical connection between the PCB and the motor.

U.S. Pat. No. 4,338,517 to Perrine is believed to relate to a shaft rotation sensor. A modular incremental rotary shaft encoder is preassembled within its housing and then installed and aligned upon the shaft of which rotation is to be sensed. The encoder housing loosely confines a thin disc assembly having a shaft receiving aperture dimensioned to be a press fit upon the shaft. The encoder is installed simply by pressing the housing and the disc assembly therein upon the shaft and fixing the housing to the shaft support. The disc assembly plane of rotation and the disc to detector gap are fixed by inserting a slender elongated installation tool through the housing cover into engagement with the disc assembly and pressing and bending the disc assembly against a fixed stop while the shaft and disc assembly are rotated. A pointed tool is inserted through the housing against the disc assembly to hold the latter against rotation while the shaft is carefully rotated to provide for rotational indexing of the disc assembly.

U.S. Pat. No. 5,859,425 to Mleinek et al. is believed to relate to an encoder having first and second housing portions and guide means. The encoder includes a casing having an open end and a base which fits in the open end. Trapezoidal cutouts in the casing are arranged to receive partly trapezoidal projections on the base. The casing contains an optical sensor, a circuit board for operation of the sensor, and a timing disc mounted on a rotary hub. The hub has a passage for a drive shaft of a motor, and the passage is in register with an opening in the base. During assembly, the drive shaft is passed through the opening in the base and the motor and casing are urged towards one another to push the base into the casing. When the base enters the casing, the projections are received in the cutouts and a guide surface in the casing engages a centering surface on the hub. Once the projections are in the cutouts, the casing and the base are rotated relative to each other to secure the base to the casing. Due to the trapezoidal shape of the cutouts and the partly trapezoidal shape of the projections, the casing moves in a direction away from the base during rotation. This causes the guide surface of the casing to disengage from the centering surface of the hub.

There is believed to be a need for a mounting arrangement for an encoder that may reduce tooling costs, that may reduce part costs, that may simplify inventory management, that may be easy to use and may be adaptable to different situations.

SUMMARY

In an example embodiment of the present invention, a device for mounting an encoder on a motor includes: a first part including at least one first mounting ear; and a second part including at least one second mounting ear, a first end of the first part adapted to connect to a second end of the second part, a second end of the first part adapted to connect to a first end of the second part to form a substantially circular cleat, an inner diameter of the cleat adapted to couple to a housing of the encoder, the mounting ears adapted to mount to the motor.

The first part and the second part may be substantially identical.

A connector of the first end of the first part may be connectable to a connector of the second end of the second part, and a connector of the second end of the first part may be connectable to a connector of the first end of the second part. The connectors may be self-complementary.

The first part and the second part may be self-complementary.

Each of the first part and the second part may be substantially semi-circular.

The inner diameter of the cleat may include at least one inner boss adapted to be received in a groove of the housing of the encoder. The inner boss may be axially asymmetric.

The cleat may be coupleable to the housing in at least two orientations. A first orientation may be such that a first surface of the cleat corresponds to a bottom surface of the cleat and is substantially coplanar with a bottom surface of the motor, and a second surface of the cleat opposite the first surface is spaced apart from the bottom surface of the motor. A second, inverted orientation may be such that the second surface of the cleat corresponds to the bottom surface of the cleat and is spaced apart from the bottom surface of the motor, and the first surface of the cleat is spaced apart from the bottom surface of the motor.

The cleat and encoder may be flush-mountable to the motor in the first orientation and mountable in a recessed pilot in the motor in the second orientation.

At least one surface of the mounting ears may be arranged at an angle with respect to a mounting surface of the cleat to urge the encoder against the motor.

The mounting ears may be one of: (a) arranged symmetrically around a circumference of the cleat; and (b) arranged asymmetrically around the circumference of the cleat.

An angular extent of the inner boss may be less than an angular extent of the groove.

A difference between the angular extent of the groove and the angular extent of the inner boss may define an angular adjustment range between the cleat and the housing of the encoder.

A difference between the angular extent of the groove and the angular extent of the inner boss may define an angular adjustment range between the encoder and the motor.

The mounting ears may be selectively removable from the first and second parts.

Each mounting ear may include a bore configured to receive a fastener therethrough to mount the cleat to the motor.

The first part and the second part may be formed of plastic, e.g., molded plastic.

According to an example embodiment of the present invention, a device for mounting an encoder on a motor includes a plurality of arcuate parts. A first end of each part is adapted to connect to a second end of an adjacent part to form a substantially circular cleat. An inner diameter of the cleat is adapted to couple to a housing of the encoder, and the cleat includes at least one mounting ear adapted to mount to the motor.

The plurality of parts may include: (a) two semicircular parts; (b) three third-circular parts; or (c) four quarter-circular parts.

In an example embodiment of the present invention, an encoder includes: housing; and a device adapted to mount the housing on a motor. The device includes a first part including at least one first mounting ear and a second part including at least one second mounting ear. A first end of the first part is adapted to connect to a second end of the second part, a second end of the first part is adapted to connect to a first end of the second part to form a substantially circular cleat. An inner diameter of the cleat is adapted to couple to the housing, and the mounting ears are adapted to mount to the motor.

According to an example embodiment of the present invention, system for measuring angular movement includes a motor, an encoder, and a device adapted to mount the encoder on the motor. The device includes a first part including at least one first mounting ear and a second part including at least one second mounting ear. A first end of the first part is adapted to connect to a second end of the second part, and a second end of the first part is adapted to connect to a first end of the second part to form a substantially circular cleat. An inner diameter of the cleat is adapted to couple to a housing of the encoder, and the mounting ears adapted to mount to the motor.

DETAILED DESCRIPTION

A servo cleat, which may be formed of plastic parts, e.g., molded plastic parts, is arranged to mount an encoder on a motor utilizing its servo ring.

A device includes a two parts, which may be formed of molded plastic and which may be semi-circular. The parts are formed such that two semi-circular parts interlock together to create a full circular cleat, as illustrated, for example in FIG. 2. The two parts may be identical, e.g., self-complementary, and, when mated together, may form a complete circle. An exemplary embodiment of the present invention may reduce tooling costs, may reduce part costs and may simplify inventory management by providing one part that interlocks with itself to form a substantially circular cleat.

The molded plastic semi-circular part may include an inner boss that engages a groove on the encoder. Because the boss is created axially asymmetrically on an inner diameter of the molded cleat, the boss may provide two alternative mounting orientations. The servo cleat may be used to mount an encoder on a flat surface, e.g., flush or pilotless mounting. Alternatively, the servo cleat may be used to mount the encoder in a recessed pilot.

The encoder may be rotated to facilitate alignment of commutation tracks with the motor windings by not tightening completely the mounting screws of the servo cleat. Additionally, the angle of the mounting surface on the molded servo cleat may provide that, when screwed down, the inclined surface of the servo-cleat creates a downward force on the boss. The boss may thereby engage the servo-ring of the encoder and allow no further movement.

The molded servo cleat may also have options in the mold tooling to provide for alternative mounting patterns. For example, with three extra mounting ears, a customer may select from a variety of mounting options. These may be available on all parts or may be available at the option of the user by providing distinct configurations of the molded part. Furthermore, depending on the combination of molded parts, numerous mounting configurations may be provided or selectable.

Figure 1:
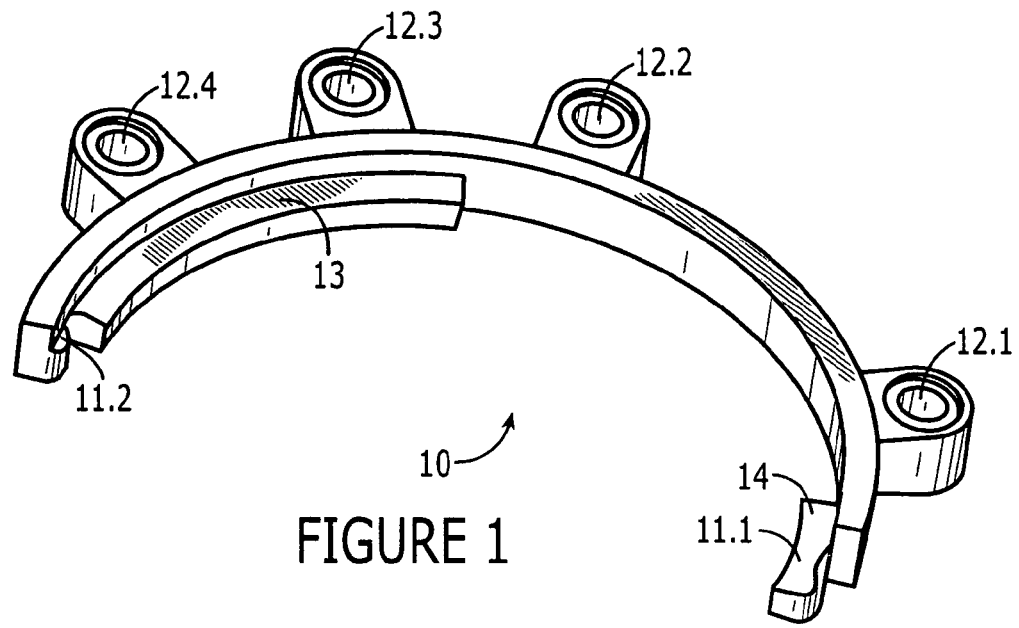
FIG. 1 is a perspective view of a part for forming a servo cleat according to an exemplary embodiment of the present invention.

FIG. 1 is a perspective view of a part 10, which may be a molded, plastic component. Molded part 10 is semi-circular, but may also be a smaller fraction of a circle, for example, one-third or one-quarter of a circle. Molded part 10 includes connectors, e.g., snap locks 11.1 and 11.2, arranged at the terminal ends of molded part 10. Snap locks 11.1 and 11.2 are cooperating elements adapted to interlock with corresponding snap locks. For example, the snap locks 11.1, 11.2 may be arranged so that the molded part 10 is self-complementary, e.g., one molded part 10 may be connectable to another molded part 10 by connection of the snap lock 11.1 of one molded part 10 to the snap lock 11.2 of the other molded part 10, and vice versa. Snap lock 11.1 may be a receiving attachment arrangement, and snap lock 11.2 may be a protruding attachment arrangement. Mounting ears 12.1, 12.2, 12.3, and 12.4 are arranged on an outside edge of molded part 10 separated radially by various angles. For example, mounting ears 12.1 and 12.2 may be separated by 60 degrees, mounting ears 12.2 and 12.3 may be separated by 30 degrees, and mounting ears 12.3 and 12.4 may be separated by 30 degrees. Alternative separation angles and more or fewer mounting ears are also possible. It should be appreciated that the number and location of mounting ears on the part 10 may provide that the assembled cleat 20 includes mounting ears arranged symmetrically around the circumference of the cleat or asymmetrically around the circumference of the cleat.

Molded part 10 of FIG. 1 also includes major inner boss 13 and minor inner boss 14. Major inner boss 13 and minor inner boss 14 extend inwardly from an inner diameter of molded part 10 on a bottom edge of the inner diameter of molded part 10. When two parts 10 are assembled to form a cleat 20, the major inner boss 13 of one part 10 abuts and is continuous with the minor inner boss 14 of the other part 10 and vice versa. This arrangement of the bosses 13, 14 is illustrated, for example, in FIGS. 2 and 4 to 7.

Figure 2:
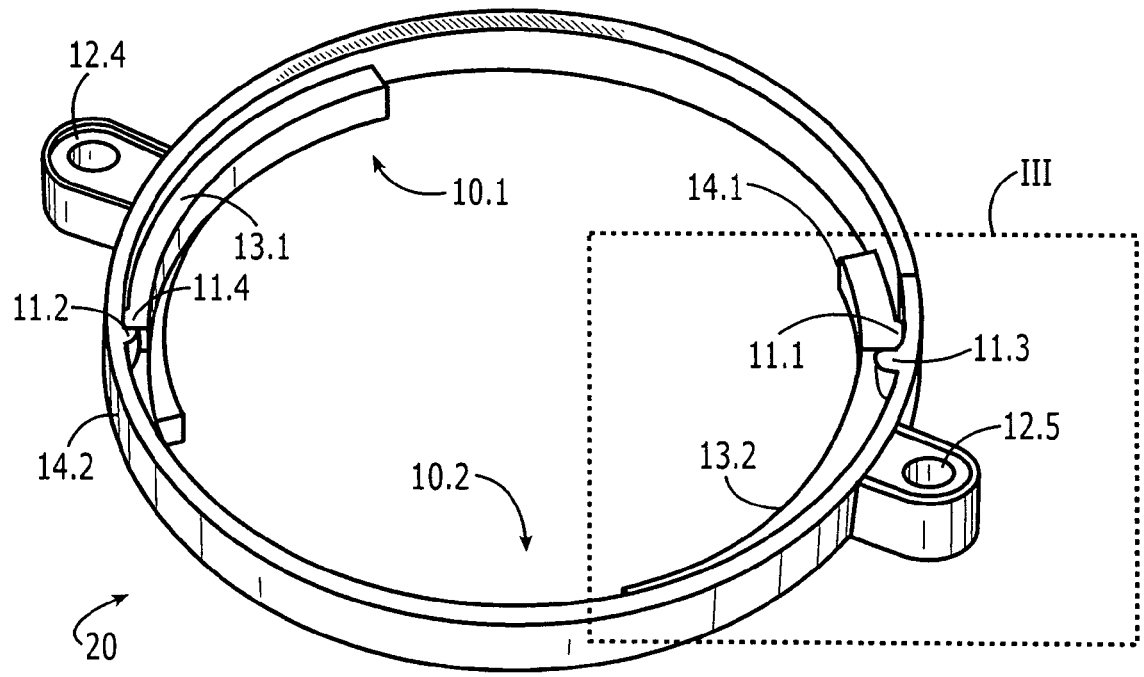
FIG. 2 is a perspective view of two parts forming a servo cleat according to an exemplary embodiment of the present invention.

FIG. 2 is a perspective view of two molded parts 10.1 and 10.2 that are connected together by their connectors to form servo cleat 20. If molded parts 10 are a lesser fraction of a circle, a corresponding larger number of molded parts 10 are required to form the circular servo cleat 10. Molded part 10.1 includes snap locks 11.1 and 11.2, and molded part 10.2 includes snap locks 11.3 and 11.4. Snap lock 11.1 engages snap lock 11.3, and snap lock 11.2 engages snap lock 11.4 to form servo cleat 20. Snap locks 11.1, 11.4 may be identical and snap locks 11.2, 11.3 may be identical so that the molded parts 10.1, 10.2 are self-complementary. The connectors themselves may also be self-complementary. Mounting ear 12.4 is arranged on an outside edge of molded part 10.1, and mounting ear 12.5 is arranged on an outside edge of molded part 10.2. When molded parts 10.1, 10.2 are coupled together, mounting ear 12.4 is separated radially from mounting ear 12.5 by 180°.

Molded part 10.1 includes major inner boss 13.1 and minor inner boss 14.1, and molded part 10.2 includes major inner boss 13.2 and minor inner boss 14.2. Major inner bosses 13.1, 13.2 and minor inner bosses 14.1, 14.2 extend inwardly from an inner diameter of molded parts 10.1, 10.2. Major inner boss 13.1 is contiguous with minor inner boss 14.2 when molded parts 10.1 and 10.2 are interlocked to form servo cleat 20. Similarly, major inner boss 13.2 is contiguous with minor inner boss 14.1 when molded parts 10.1 and 10.2 are interlocked.

Figure 3:
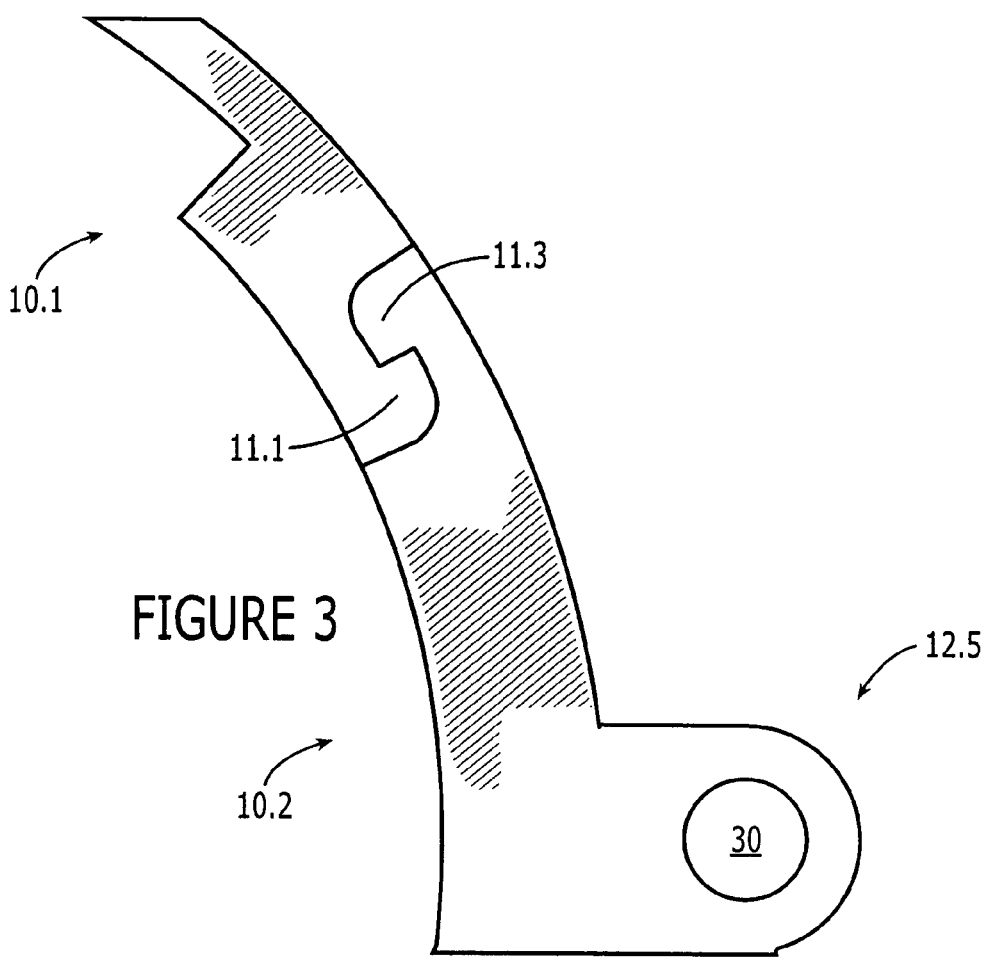
FIG. 3 is an enlarged view of section III illustrated in FIG. 2 illustrating a connection between the two parts.

FIG. 3 is an enlarged view of section III of FIG. 2 illustrating a connection between molded parts 10.1 and 10.2. As illustrated in FIG. 3, each snap lock 11.1, 11.3, and consequently each snap lock 11.2, 11.4, may be self-complementary. Also illustrated in FIG. 3 is mounting ear 12.5 including a receiving arrangement 30, e.g., a bore, which may be adapted to receive a bolt, screw, other coupling arrangement, etc., for mounting the cleat 20, and consequently an encoder, to a motor.

Figure 4:
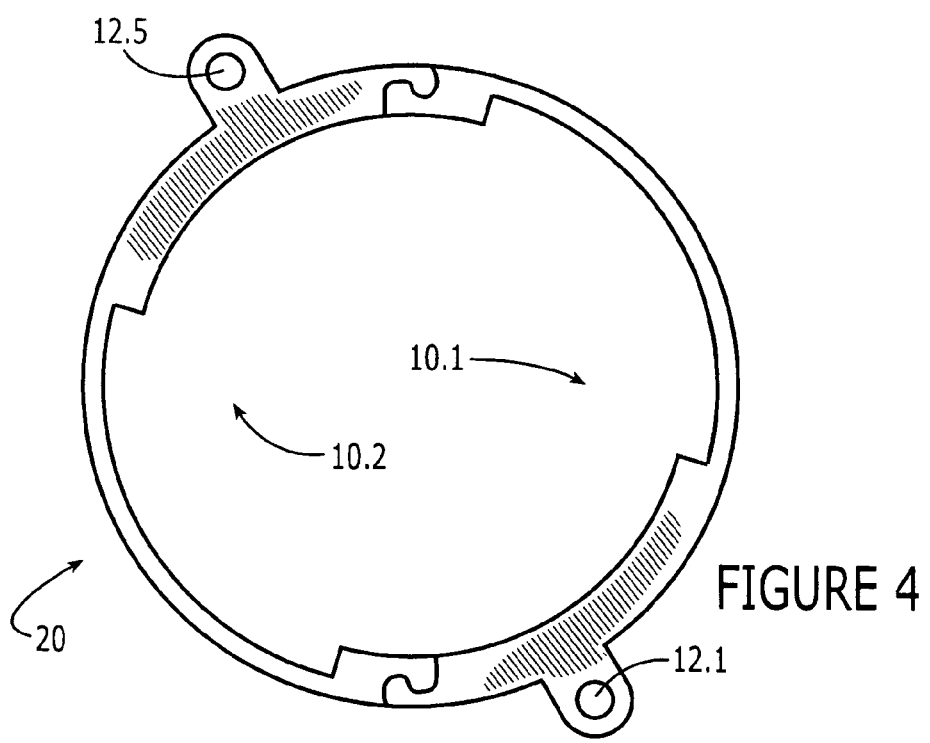
FIG. 4 is a top view of two parts forming a servo cleat illustrating two mounting ears on the servo cleat oriented at 180° with respect to each other.

FIG. 4 is a top view of molded parts 10.1 and 10.2 forming servo cleat 20 illustrating mounting ears 12.5 and 12.1 oriented at 180° with respect to each other.

Figure 5:
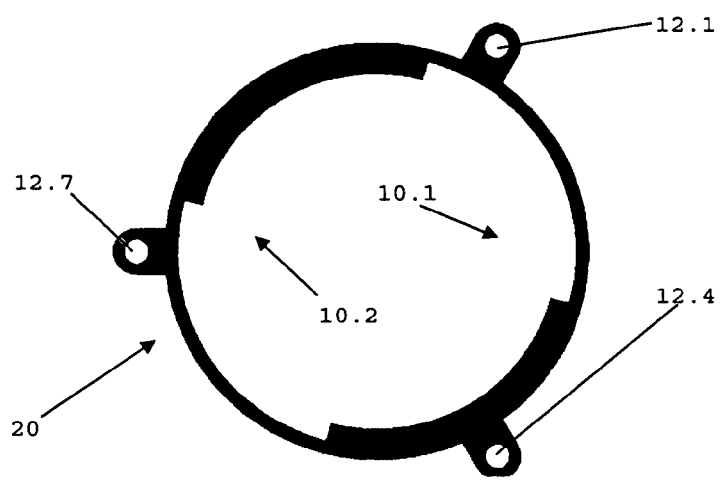
FIG. 5 is a top view of two parts forming a servo cleat illustrating three mounting ears on the servo cleat oriented at 120° with respect to each other.

FIG. 5 is a top view of molded parts 10.1 and 10.2 forming servo cleat 20 illustrating mounting ears 12.1, 12.4 and 12.7 oriented at 120° with respect to each other.

Figure 6:
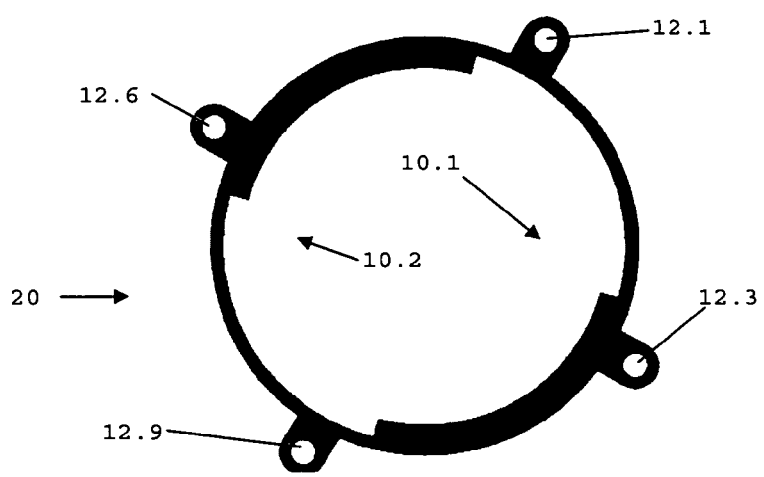
FIG. 6 is a top view of two parts forming a servo cleat illustrating four mounting ears on the servo cleat oriented at 90° with respect to each other.

FIG. 6 is a top view of molded parts 10.1 and 10.2 forming servo cleat 20 illustrating mounting ears 12.1, 12.3 12.6 and 12.9 oriented at 90° with respect to each other.

Figure 7:
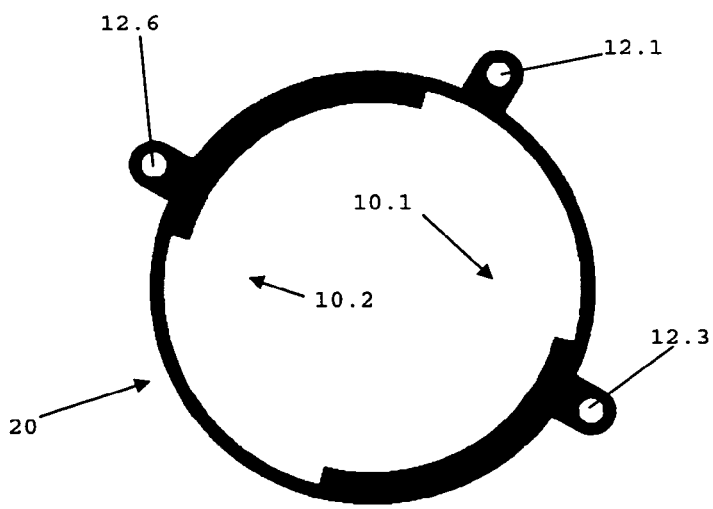
FIG. 7 is a top view of two parts forming a servo cleat illustrating three mounting ears on the servo cleat separated by 90°, 90° and 180°.

FIG. 7 is a top view of molded parts 10.1 and 10.2 forming servo cleat 20 illustrating mounting ears 12.1 and 12.3 separated by 90°, mounting ears 12.3 and 12.6 separated by 180°, and mounting ears 12.1 and 12.6 separated by 90°.

It should be appreciated that the number and location of mounting ears illustrated in FIGS. 4 to 7 are merely exemplary, that molded part 10 may have any desired number and location of mounting ears and that servo cleat 20 may have any desired number and location of mounting ears.

Figure 8:
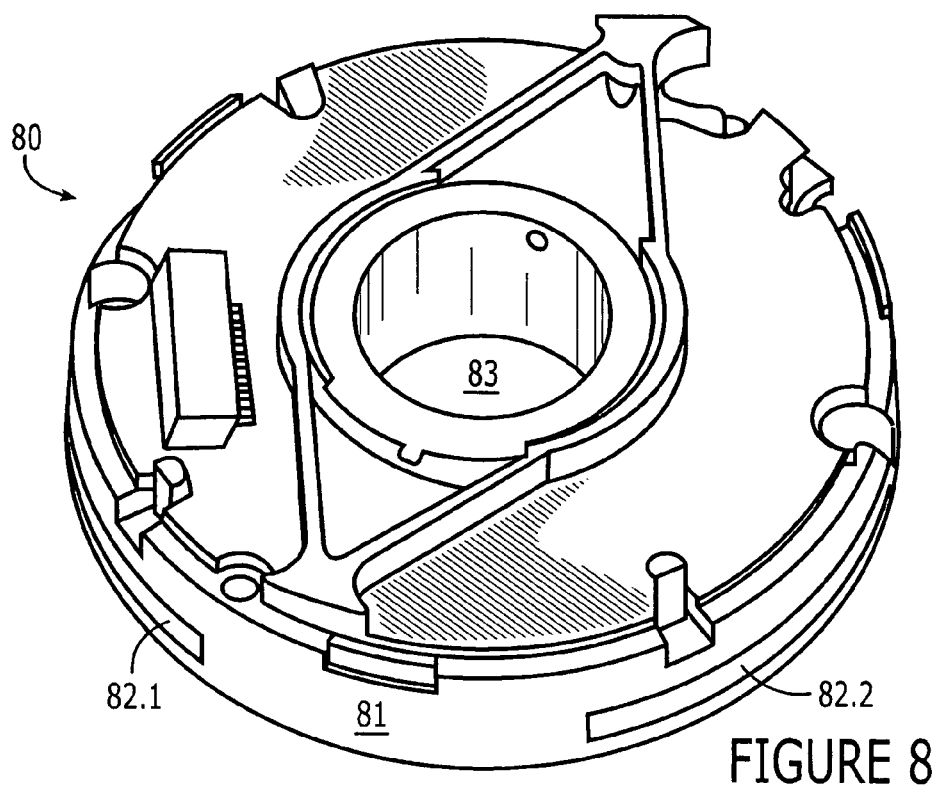
FIG. 8 is a perspective view of an encoder coupleable to a cleat according to an exemplary embodiment of the present invention.

FIG. 8 is a perspective view of an encoder 80 according to an exemplary embodiment of the present invention. Encoder 80 includes outer diameter surface 81 having receiving grooves 82.1 and 82.2. The grooves 82.1, 82.2 are arranged to receive bosses 13.1, 13.2, 14.1, 14.2 therein. The grooves 82.1, 82.2 may have a greater angular extent than the bosses 13.1/14.2, 13.2/14.1 so that the servo cleat 20, when attached to the encoder 80, permits a certain degree of angular movement between the servo cleat 20 and the encoder, e.g., for adjustment purposes. A single, continuous groove around an entire circumference, or a portion thereof, may be provided I the encoder 80 instead of the two grooves 82.1, 82.2. In addition, more than two grooves may be provided. Encoder 80 also includes shaft receiver 83 arranged in the center of encoder 80.

Figure 9:
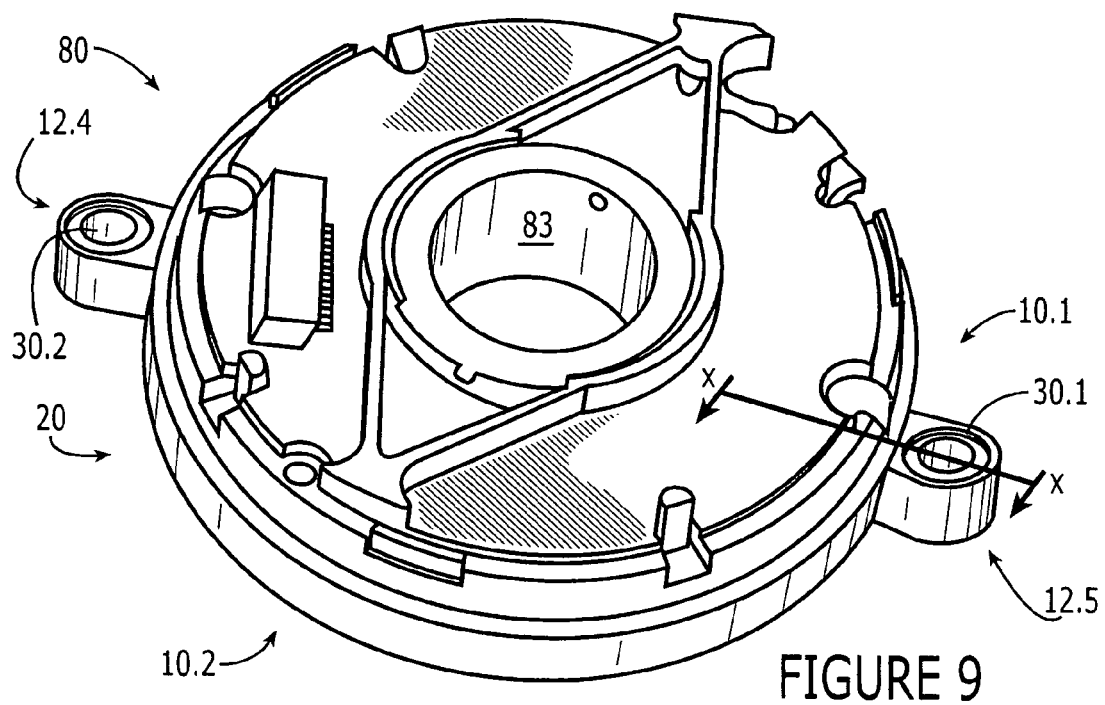
FIG. 9 is a perspective view of the encoder illustrated in FIG. 8 mounted in a servo cleat according to an exemplary embodiment of the present invention.

FIG. 9 is a perspective view of encoder 80 illustrated in FIG. 8 mounted in servo cleat 20. Servo cleat 20 includes molded parts 10.1 and 10.2. Molded part 10.1 includes mounting ear 12.5, and molded part 10.2 includes mounting ear 12.4. Mounting ear 12.5 includes receiving arrangement 30.1, e.g., a bore, and mounting ear 12.4 includes receiving arrangement 30.2, e.g., a bore. Servo cleat 20 is arranged adjacent to, and coupled to, outer diameter surface 81 of encoder 80.

Figure 10:
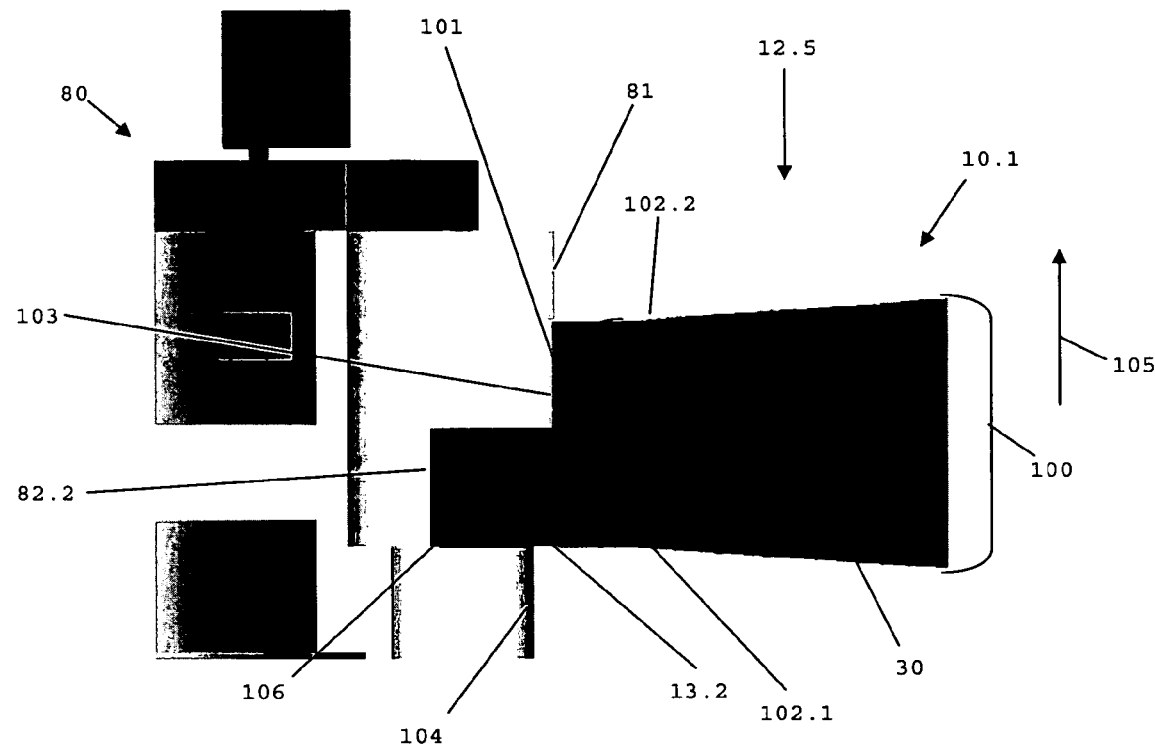
FIG. 10 is a cross-sectional view of the encoder and a portion of the servo cleat illustrated in FIG. 9 taken along line X-X.

FIG. 10 is a cross-sectional view of encoder 80 and molded part 10.1 illustrated in FIG. 9 taken along line X-X. FIG. 10 illustrates inner boss 13.2 of molded part 10.1 received in cleat groove 82.2. Outer diameter surface 81 of encoder 80 abuts inner diameter surface 103 of molded part 10.1 in the configuration illustrated in FIG. 10. FIG. 10 also illustrates recessed outer diameter surface 104 on a lower edge of outer diameter surface 81. Molded part 10.1 includes mounting ear 12.5. Mounting ear 12.5 illustrated in cross-section includes receiving arrangement 30, e.g., a bore, outer thickness 100, and inner thickness 101. Outer thickness 100 is greater than inner thickness 101, causing first angle 102.1 to exist on a bottom surface of mounting ear 12.5 and second angle 102.2 to exist on a top surface of mounting ear 12.5. Because of first angle 102.1, bolting or otherwise clamping mounting ear 12.5 to a flat surface causes mounting ear 12.5 to flex upwardly on an outer diameter in the direction or arrow 105. This flexing causes pressure by inner boss 13.2 downwardly in the direction of arrow 106 on cleat groove 82.2, thereby creating a downward force on encoder 80, e.g., a force toward the motor.

Figure 11:
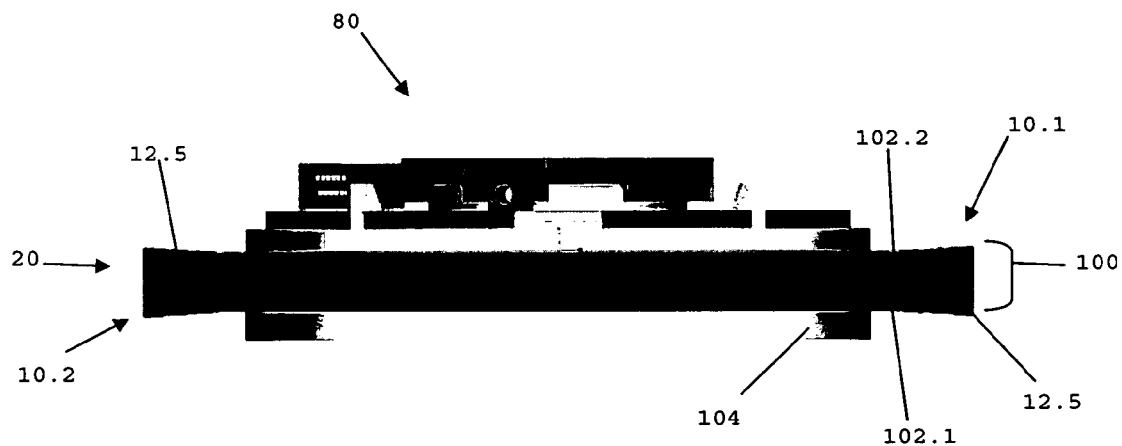
FIG. 11 is a side view of the encoder and servo cleat illustrated in FIG. 10.

FIG. 11 is a side view of encoder 80 and servo cleat 20 illustrated in FIG. 10. Servo cleat 20 includes molded part 10.1 having mounting ear 12.5 and molded part 10.2 having mounting ear 12.4. Mounting ear 12.5 includes first angle 102.1 and second angle 102.2 due to outer thickness 100. Mounting ear 12.4 may or may not also include an outer thickness greater than an inner thickness and a bottom angle and a top angle. Recessed outer diameter surface 104 extends below a lower edge of servo cleat 20 as shown in the configuration of FIGS. 10 and 11. Recessed outer diameter surface 104 may project into a pilot of a motor or other device.

Figure 12:
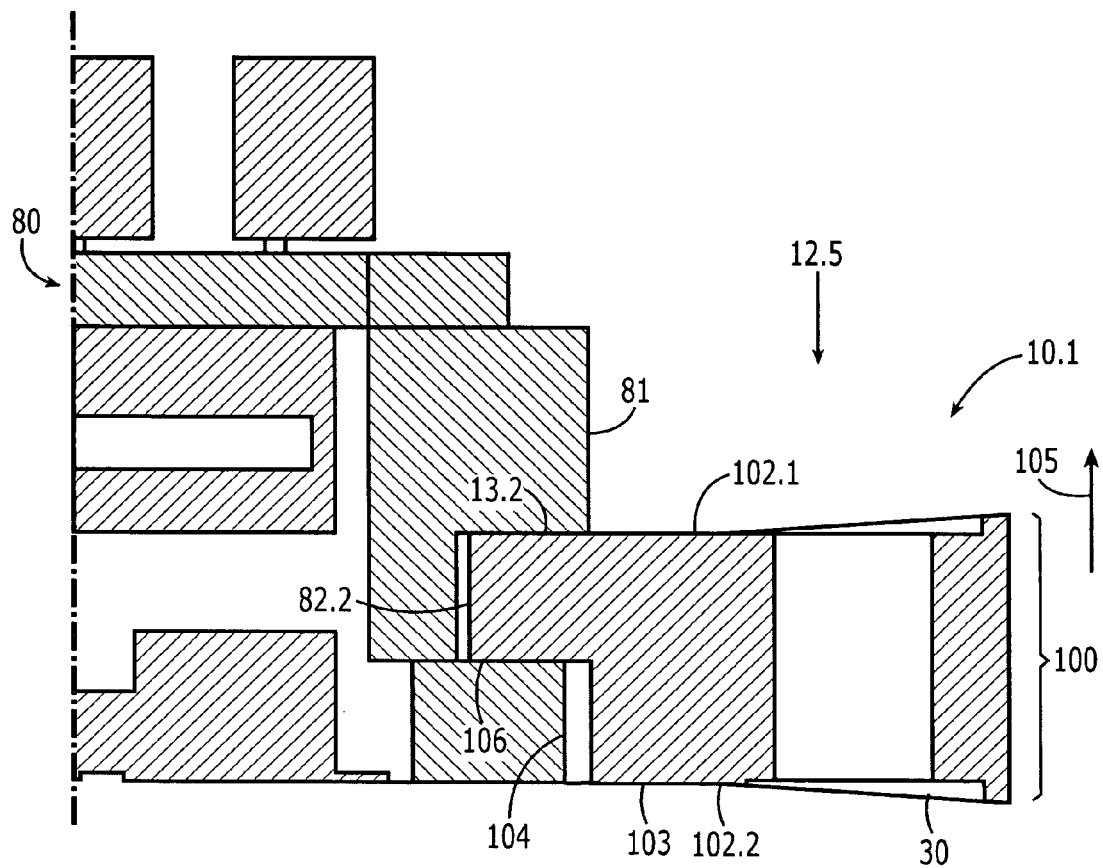
FIG. 12 is a cross-sectional view of the encoder and a portion of the servo cleat illustrated in FIG. 9 taken along line X-X with the servo cleat in an alternative, inverted orientation with respect to the encoder illustrated in FIGS. 10 and 11.

FIG. 12 is a cross-sectional view of encoder 80 and molded part 10.1 illustrated in FIG. 9 taken along line X-X with servo cleat 20 in an alternative configuration with respect to encoder 80 than the configuration illustrated in FIGS. 10 and 11. In particular, servo cleat 20 is inverted relative to the arrangement of the servo cleat 20 illustrated in FIG. 10. FIG. 12 illustrates inner boss 13.2 of molded part 10.1 received in cleat groove 82.2. Outer diameter surface 81 of encoder 80 is exposed in the configuration illustrated in FIG. 12. FIG. 12 also illustrates recessed outer diameter surface 104 adjacent to inner diameter surface 103 of molded part 10.1. Molded part 10.1 includes mounting ear 12.5. Mounting ear 12.5 illustrated in cross-section includes bore 30, outer thickness 100, and inner thickness 101. Outer thickness 100 is greater than inner thickness 101, causing second angle 102.2 to exist on a bottom surface of mounting ear 12.5 and first angle 102.1 to exist on a top surface of mounting ear 12.5. Because of second angle 102.2, bolting or otherwise clamping mounting ear 12.5 to a flat surface causes mounting ear 12.5 to flex upwardly on an outer diameter in the direction or arrow 105. This flexing causes pressure by inner boss 13.2 downwardly in the direction of arrow 106 on cleat groove 82.2, thereby creating a downward force on encoder 80, e.g., a force toward the motor. The arrangement of the servo cleat 20 as illustrated in FIG. 12 permits flush-mounting, e.g., pilotless mounting, of the encoder 80.

Figure 13:
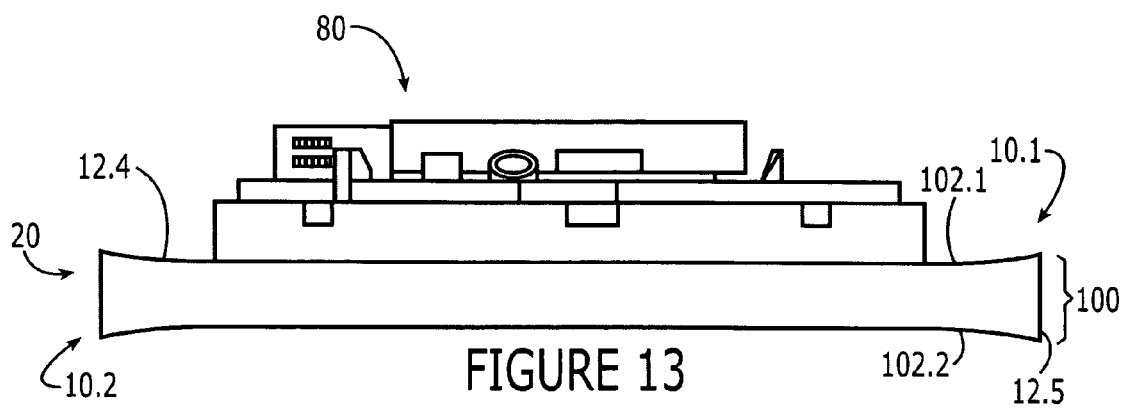
FIG. 13 is a side view of the encoder and servo cleat illustrated in FIG. 12.

FIG. 13 is a side view of encoder 80 and servo cleat 20 illustrated in FIG. 12. Servo cleat 20 includes molded part 10.1 having mounting ear 12.5 and molded part 10.2 having mounting ear 12.4. Mounting ear 12.5 includes first angle 102.1 and second angle 102.2 due to outer thickness 100. Mounting ear 12.4 may or may not also include an outer thickness greater than an inner thickness and a bottom angle and a top angle. The bottom surface of the encoder 80 and the bottom surface of servo cleat 20 are substantially flush in the configuration illustrated FIGS. 12 and 13, thereby permitting the encoder 80 to be flush-mounted, e.g., pilotlessly mounted.

It should be appreciated that the part 10 may include all or some of the mounting ears 12.1, 12.2, 12.3, 12.4 illustrated in FIG. 1 and that the mounting ears 12.1, 12.2, 12.3, 12.4 may be selectively removable from the part 10 depending on, e.g., the desired number and location(s) of mounting ears. Any unwanted or unnecessary mounting ears 12.1, 12.2, 12.3, 12.4 may be removed before or after assembly of two parts 10 to obtain the servo cleat 20. It should also be appreciated that the mounting ears 12.1, 12.2, 12.3, 12.4 may be selectively formed, e.g., molded, during manufacture of the part 10.

What is claimed is:

1. A device for mounting an encoder on a motor, comprising:
    a first part including at least one first mounting ear, and
    a second part including at least one second mounting ear, a first end of the first part adapted to connect to a second end of the second part, a second end of the first part adapted to connect to a first end of the second part to form a substantially circular cleat, an inner diameter of the cleat adapted to couple to a housing of the encoder, the mounting ears adapted to mount to the motor;
    wherein the cleat is coupleable to the housing in at least two orientations including: (a) a first orientation in which a first surface of the cleat corresponds to a bottom surface of the cleat and is substantially coplanar with a bottom surface of the motor, and a second surface of the cleat opposite the first surface is spaced apart from the bottom surface of the motor; and (b) a second, inverted orientation in which the second surface of the cleat corresponds to the bottom surface of the cleat and is spaced apart from the bottom surface of the motor, and the first surface of the cleat is spaced apart from the bottom surface of the motor; and
    wherein the cleat and encoder are flush-mountable to the motor in the first orientation and mountable in a recessed pilot in the motor in the second orientation.

2. The device according to claim 1, wherein the first part and the second part are substantially identical.

3. The device according to claim 1, wherein a connector of the first end of the first part is connectable to a connector of the second end of the second part, and a connector of the second end of the first part is connectable to a connector of the first end of the second part.

4. The device according to claim 3, wherein the connectors are self-complementary.

5. The device according to claim 1, wherein the first part and the second part are self-complementary.

6. The device according to claim 1, wherein each of the first part and the second part is substantially semi-circular.

7. The device according to claim 1, wherein the inner diameter of the cleat includes at least one inner boss adapted to be received in a groove of the housing of the encoder.

8. The device according to claim 7, wherein the inner boss is axially asymmetric.

9. The device according to claim 1, wherein at least one surface of the mounting ears is arranged at an angle with respect to a mounting surface of the cleat to urge the encoder against the motor.

10. The device according to claim 1, wherein the mounting ears are arranged symmetrically around a circumference of the cleat.

11. The device according to claim 1, wherein the mounting ears are selectively removable from the first and second parts.

12. The device according to claim 1, wherein each mounting ear includes a bore configured to receive a fastener therethrough to mount the cleat to the motor.

13. The device according to claim 1, wherein the first part and the second part are formed of plastic.

14. The device according to claim 1,, wherein the first part and the second part are formed of molded plastic.

15. The device according to claim 1, wherein the mounting ears are arranged asymmetrically around the circumference of the cleat.

16. The device according to claim 1, wherein the inner diameter of the cleat includes at least one inner boss adapted to be received in a groove of the housing of the encoder, and wherein an angular extent of the inner boss is less than an angular extent of the groove.

17. A device for mounting an encoder on a motor, comprising:
    a first part including at least one first mounting ear; and
    a second part including at least one second mounting ear, a first end of the first part adapted to connect to a second end of the second part, a second end of the first part adapted to connect to a first end of the second part to form a substantially circular cleat, an inner diameter of the cleat adapted to couple to a housing of the encoder, the mounting ears adapted to mount to the motor;
    wherein the inner diameter of the cleat includes at least one inner boss adapted to be received in a groove of the housing of the encoder; and
    wherein an angular extent of the inner boss is less than an angular extent of the groove.

18. The device according to claim 17, wherein the cleat is coupleable to the housing in at least two orientations including: (a) a first orientation in which a first surface of the cleat corresponds to a bottom surface of the cleat and is substantially coplanar with a bottom surface of the motor, and a second surface of the cleat opposite the first surface is spaced apart from the bottom surface of the motor; and (b) a second, inverted orientation in which the second surface of the cleat corresponds to the bottom surface of the cleat and is spaced apart from the bottom surface of the motor, and the first surface of the cleat is spaced apart from the bottom surface of the motor.

19. The device according to claim 17, wherein a difference between the angular extent of the groove and the angular extent of the inner boss defines an angular adjustment range between the cleat and the housing of the encoder.

20. The device according to claim 17, wherein a difference between the angular extent of the groove and the angular extent of the inner boss defines an angular adjustment range between the encoder and the motor.

21. The device according to claim 17, wherein the first part and the second part are substantially identical.

22. The device according to claim 17, wherein a connector of the first end of the first part is connectable to a connector of the second end of the second part, and a connector of the second end of the first part is connectable to a connector of the first end of the second part.

23. The device according to claim 22, wherein the connectors are self-complementary.

24. The device according to claim 17, wherein the first part and the second part are self-complementary.

25. The device according to claim 17, wherein each of the first part and the second part is substantially semi-circular.

26. The device according to claim 17, wherein the inner boss is axially asymmetric.

27. The device according to claim 17, wherein at least one surface of the mounting ears is arranged at an angle with respect to a mounting surface of the cleat to urge the encoder against the motor.

28. The device according to claim 17, wherein the mounting ears are arranged symmetrically around a circumference of the cleat.

29. The device according to claim 17, wherein the mounting ears are arranged asymmetrically around the circumference of the cleat.

30. The device according to claim 17, wherein the mounting ears are selectively removable from the first and second parts.

31. The device according to claim 17, wherein each mounting ear includes a bore configured to receive a fastener therethrough to mount the cleat to the motor.

32. The device according to claim 17, wherein the first part and the second part are formed of plastic.

33. The device according to claim 17, wherein the first part and the second part are formed of molded plastic.

34. The device according to claim 17, wherein the cleat is coupleable to the housing in at least two orientations including: (a) a first orientation in which a first surface of the cleat corresponds to a bottom surface of the cleat and is substantially coplanar with a bottom surface of the motor, and a second surface of the cleat opposite the first surface is spaced apart from the bottom surface of the motor; and (b) a second, inverted orientation in which the second surface of the cleat corresponds to the bottom surface of the cleat and is spaced apart from the bottom surface of the motor, and the first surface of the cleat is spaced apart from the bottom surface of the motor, and wherein the cleat and encoder are flush-mountable to the motor in the first orientation and mountable in a recessed pilot in the motor in the second orientation.

35. A device for mounting an encoder on a motor, comprising:
 a plurality of arcuate parts, a first end of each part adapted to connect to a second end of an adjacent part to form a substantially circular cleat, an inner diameter of the cleat adapted to couple to a housing of the encoder, the cleat including at least one mounting ear adapted to mount to the motor;
 wherein the cleat is coupleable to the housing in at least two orientations including: (a) a first orientation in which a first surface of the cleat corresponds to a bottom surface of the cleat and is substantially coplanar with a bottom surface of the motor, and a second surface of the cleat opposite the first surface is spaced apart from the bottom surface of the motor; and (b) a second, inverted orientation in which the second surface of the cleat corresponds to the bottom surface of the cleat and is spaced apart from the bottom surface of the motor, and the first surface of the cleat is spaced apart from the bottom surface of the motor; and
 wherein the cleat and encoder are flush-mountable to the motor in the first orientation and mountable in a recessed pilot in the motor in the second orientation.

36. The device according to claim 35, wherein the plurality of parts includes one of: (a) two semicircular parts; (b) three third-circular parts; and (c) four quarter-circular parts.

37. An encoder, comprising:
 a housing; and
 a device adapted to mount the housing on a motor, the device including:
  a first part including at least one first mounting ear; and
  a second part including at least one second mounting ear, a first end of the first part adapted to connect to a second end of the second part, a second end of the first part adapted to connect to a first end of the second part to form a substantially circular cleat, an inner diameter of the cleat adapted to couple to the housing, the mounting ears adapted to mount to the motor;
 wherein the cleat is coupleable to the housing in at least two orientations including: (a) a first orientation in which a first surface of the cleat corresponds to a bottom surface of the cleat and is substantially coplanar with a bottom surface of the motor, and a second surface of the cleat opposite the first surface is spaced apart from the bottom surface of the motor; and (b) a second, inverted orientation in which the second surface of the cleat corresponds to the bottom surface of the cleat and is spaced apart from the bottom surface of the motor, and the first surface of the cleat is spaced apart from the bottom surface of the motor; and
 wherein the cleat and encoder are flush-mountable to the motor in the first orientation and mountable in a recessed pilot in the motor in the second orientation.

38. A system for measuring angular movement, comprising:
 a motor;
 an encoder; and
 a device adapted to mount the encoder on the motor, the device including:
  a first part including at least one first mounting ear; and
  a second part including at least one second mounting ear, a first end of the first part adapted to connect to a second end of the second part, a second end of the first part adapted to connect to a first end of the second part to form a substantially circular cleat, an inner diameter of the cleat adapted to couple to a housing of the encoder, the mounting ears adapted to mount to the motor;
 wherein the cleat is coupleable to the housing in at least two orientations including: (a) a first orientation in which a first surface of the cleat corresponds to a bottom surface of the cleat and is substantially coplanar with a bottom surface of the motor, and a second surface of the cleat opposite the first surface is spaced apart from the bottom surface of the motor; and (b) a second, inverted orientation in which the second surface of the cleat corresponds to the bottom surface of the cleat and is spaced apart from the bottom surface of the motor, and the first surface of the cleat is spaced apart from the bottom surface of the motor; and wherein the cleat and encoder are flush-mountable to the motor in the first orientation and mountable in a recessed pilot in the motor in the second orientation.

39. A device for mounting an encoder on a motor, comprising:

a plurality of arcuate parts, a first end of each part adapted to connect to a second end of an adjacent part to form a substantially circular cleat, an inner diameter of the cleat adapted to couple to a housing of the encoder, the cleat including at least one mounting ear adapted to mount to the motor;

wherein the inner diameter of the cleat includes at least one inner boss adapted to be received in a groove of the housing of the encoder; and wherein an angular extent of the inner boss is less than an angular extent of the groove.

40. An encoder, comprising:

a housing; and a device adapted to mount the housing on a motor, the device including:

a first part including at least one first mounting ear; and a second part including at least one second mounting ear, a first end of the first part adapted to connect to a second end of the second part, a second end of the first part adapted to connect to a first end of the second part to form a substantially circular cleat, an inner diameter of the cleat adapted to couple to the housing, the mounting ears adapted to mount to the motor;

wherein the inner diameter of the cleat includes at least one inner boss adapted to be received in a groove of the housing of the encoder; and wherein an angular extent of the inner boss is less than an angular extent of the groove.

41. A system for measuring angular movement, comprising:

a motor;

an encoder; and a device adapted to mount the encoder on the motor, the device including:

a first part including at least one first mounting ear; and a second part including at least one second mounting ear, a first end of the first part adapted to connect to a second end of the second part, a second end of the first part adapted to connect to a first end of the second part to form a substantially circular cleat, an inner diameter of the cleat adapted to couple to a housing of the encoder, the mounting ears adapted to mount to the motor;

wherein the inner diameter of the cleat includes at least one inner boss adapted to be received in a groove of the housing of the encoder; and wherein an angular extent of the inner boss is less than an angular extent of the groove.

* * * * *